UNITED STATES PATENT OFFICE.

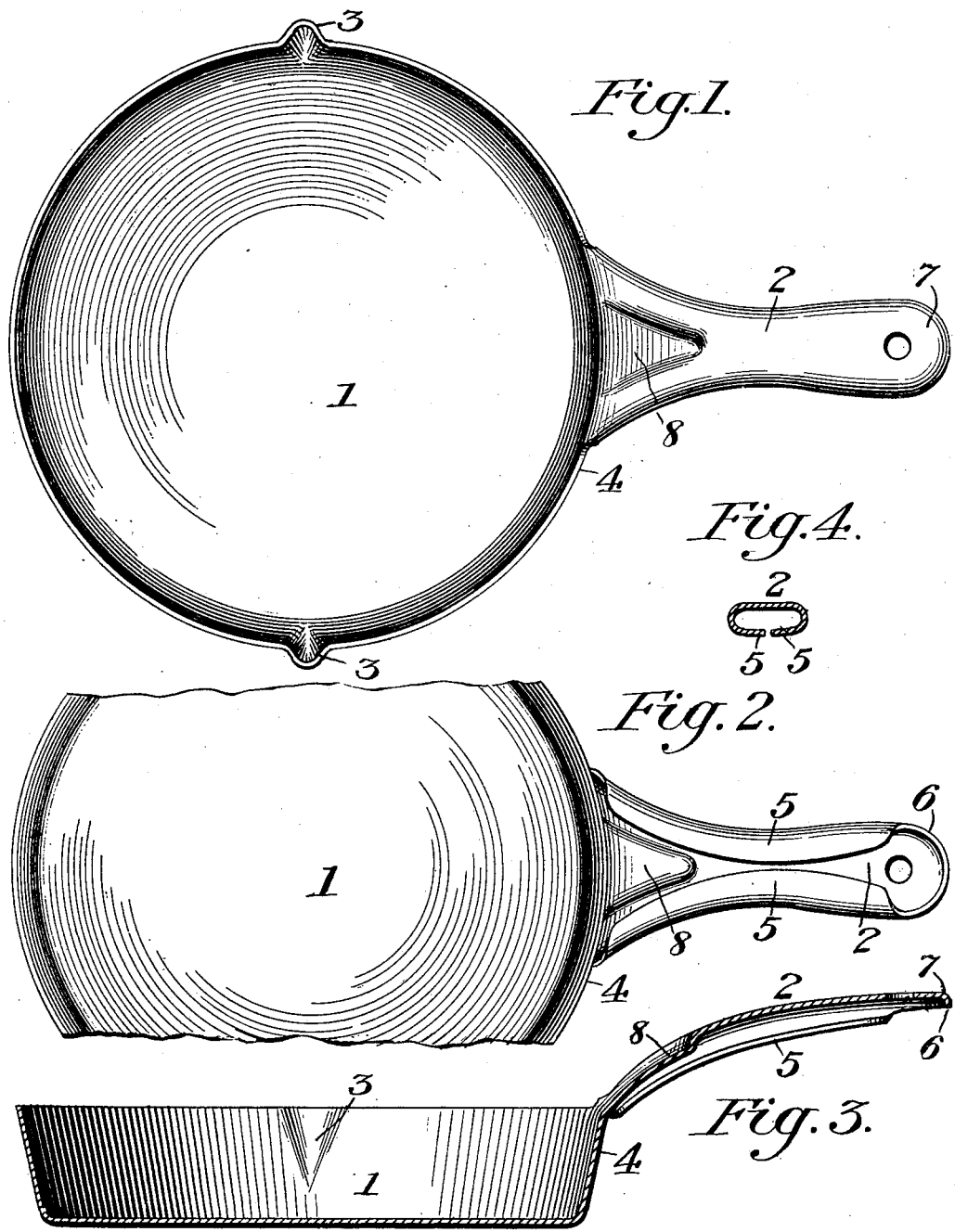

ROBERT FRANK SIMMONS, OF BROOKLYN, NEW YORK, ASSIGNOR TO NEW YORK STAMPING COMPANY, OF BROOKLYN, NEW YORK, A CORPORATION OF NEW YORK.

FRYING-PAN.

998,927.  Specification of Letters Patent.  Patented July 25, 1911.

Application filed March 16, 1911. Serial No. 614,890.

*To all whom it may concern:*

Be it known that I, ROBERT FRANK SIMMONS, a citizen of the United States, residing at Brooklyn, in the county of Kings and State of New York, have invented a certain new and useful Improvement in Frying-Pans, of which the following is a full, clear, and exact description.

The object of this invention is to provide a one-piece frying pan, skillet or spider, having a strong integral, air-cooled handle, that may be easily grasped, and upon which a firm hold may be maintained by the user, and which may be economically manufactured and sold. This object is attained in and by the principle of construction herein shown and described, wherein a pan made of sheet steel or other suitable metal, has its bowl drawn up by two operations, in the first of which the handle is blanked out integrally with the bowl and supplied with a depression, and subsequently the handle is flanged on both sides and at its tip, and thereafter the side flanges are bent or closed in underneath so as to get their edges as close together as possible to form a hollow self-cooling handle, and finally the handle-finishing operation is performed, all as I will proceed now more particularly to set forth and finally claim.

In the accompanying drawings illustrating the invention, in the several figures of which like parts are similarly designated, Figure 1 is a top plan view. Fig. 2 is a bottom plan view with opposite sides broken away. Fig. 3 is a longitudinal section. Fig. 4 is a cross-section of the handle at about its middle.

The bowl 1 and its handle 2 are blanked out of sheet steel or other suitable metal, in one integral piece, by any suitable means, and then the bowl and handle are shaped and finished in suitable machines, such as draw-presses, in and by any suitable or necessary number of successive operations to turn out a finished article. The bowl may have suitably located pouring lips 3.

The handle is a continuation of the edge of the rim 4 of the bowl, widest next to said rim, with its side lines tapering convergently toward the center of the handle, thus leaving the greatest width of handle next to the bowl so as to obtain the requisite strength at the weakest point. The handle also curves off from the rim 4 at any suitable elevation, such, for example, as shown in Fig. 3; its side flanges 5 are closed in underneath, and their edges nearly or quite meet at about the middle of the handle, in rounded form, so as to provide a substantially hollow and air-cooled hand-grip, as indicated in Fig. 4. In order to strengthen and remove sharp projecting edges the side flanges are continued in less depth clear around the tip of the handle, as indicated at 6, Figs. 2 and 3, and rounded off above, as indicated at 7 in Figs. 1 and 3. At the place where the handle joins or rather springs from the rim of the bowl, there is a depression, or technically, a "dish" 8, which substantially follows the outline of the handle at this place, and this depression or dish serves the double purpose of reinforcing or stiffening the handle, and taking up the surplus metal.

By the construction described, frying pans, skillets and spiders of very durable and strong qualities may be economically made, and sold at low price and fair profit.

Details may be varied within the scope and intent of the claims following; and further, by the use of the term "frying pan," I mean to include skillets, spiders and utensils of similar character to which my invention is applicable.

What I claim is:—

1. A one piece frying pan, having a bowl and a handle formed integral one with the other, the handle being a continuation of the edge of the rim of the bowl, widest next to the bowl, and having its sides curved convergently toward the center of the handle and its side edges closed in underneath to form a hollow air-cooled grip at about the middle of the handle, and also having the edge flanges divergent toward and continued around the tip, and the upper surface of the tip rounded off.

2. A one piece frying pan, having a bowl and a handle formed integral one with the other, the handle being a continuation of the edge of the rim of the bowl, widest next to the bowl, and having its sides curved convergently toward the center of the handle and its side edges closed in underneath to form a hollow air-cooled grip at about the middle of the handle, and also having the edge flanges continued around the tip, and the upper surface of the tip rounded off,
5 said handle also having a depression in its widest part next to the bowl to stiffen the handle and take up surplus metal.

In testimony whereof I have hereunto set my hand this 15 day of March A. D. 1911.

ROBERT FRANK SIMMONS.

Witnesses:
T. B. EASBY,
HARRY SHEDINGS.

Copies of this patent may be obtained for five cents each, by addressing the "Commissioner of Patents, Washington, D. C."